United States Patent [19]
Stedman et al.

[11] 3,815,962
[45] June 11, 1974

[54] TRACK LINKS FOR CUSHION TRACK

[75] Inventors: Robert N. Stedman, Chillicothe; Roger L. Boggs, East Peoria, both of Ill.

[73] Assignee: Caterpillar Tractor Co., Peoria, Ill.

[22] Filed: Dec. 4, 1972

[21] Appl. No.: 311,824

[52] U.S. Cl..................... 305/19, 305/54, 152/182
[51] Int. Cl....................... B62d 55/28, B60c 27/20
[58] Field of Search............ 305/39, 58, 59, 54, 55, 305/19; 152/182

[56] References Cited
UNITED STATES PATENTS

| | | | |
|---|---|---|---|
| 2,558,922 | 7/1951 | Bechman | 305/55 X |
| 3,717,389 | 2/1973 | Boggs | 305/58 |
| R15,790 | 3/1924 | Gruber | 305/58 |

*Primary Examiner*—Richard J. Johnson
*Attorney, Agent, or Firm*—Phillips, Moore, Weissenberger, Lempio & Strabala

[57] ABSTRACT

A cushion track comprises an annular resilient driver having a track assembly mounted therearound. The track assembly comprises a pair of laterally spaced, articulated link assemblies closely coupling a plurality of ground-engaging track shoes together. Each link assembly comprises first and second parallel link members having retaining means extending transversely therefrom and releasably connected to each track shoe by at least one bolt. The retaining means comprises a flange integrally formed on each link member or a separate T-shaped member disposed between the link members.

23 Claims, 11 Drawing Figures

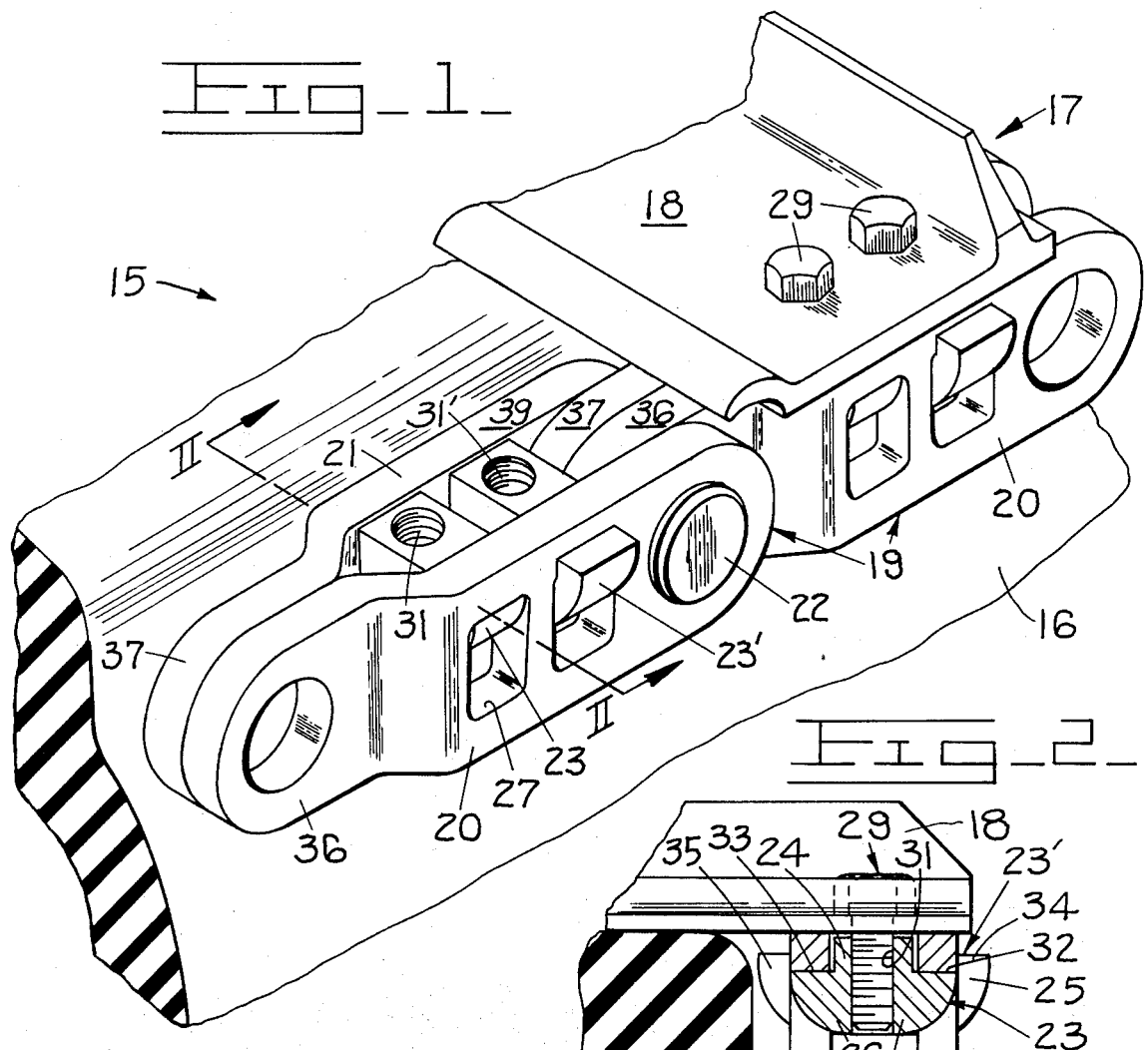
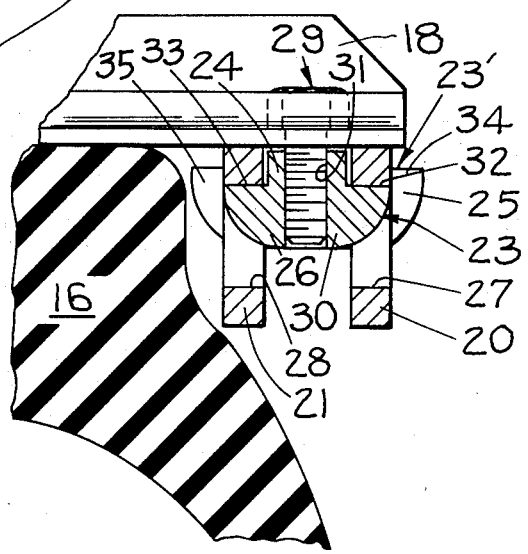
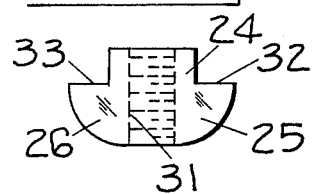
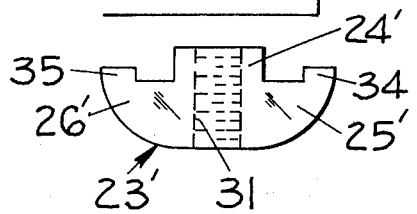

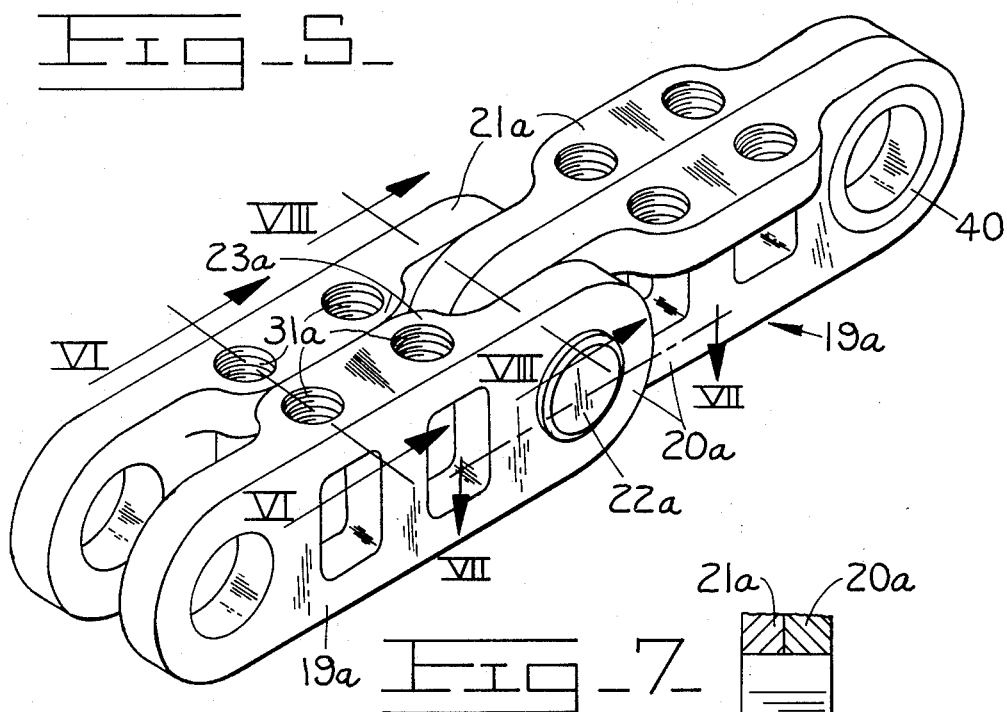
Fig_5_
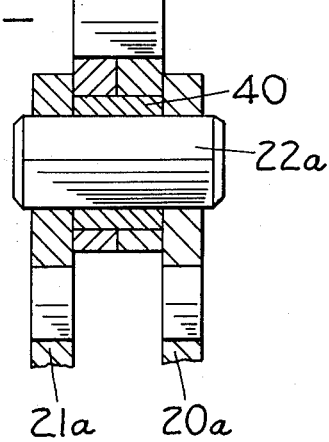
Fig_7_
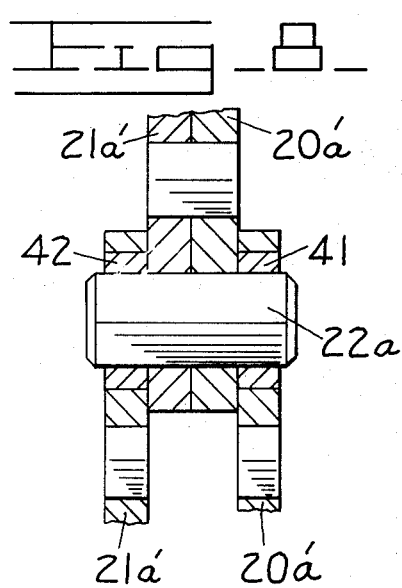
Fig_8_
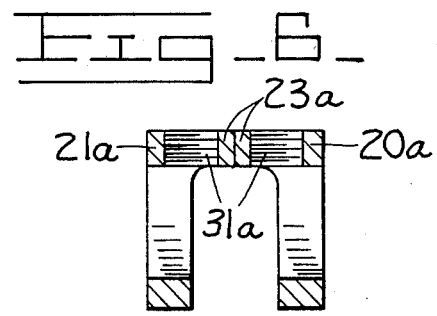
Fig_6_

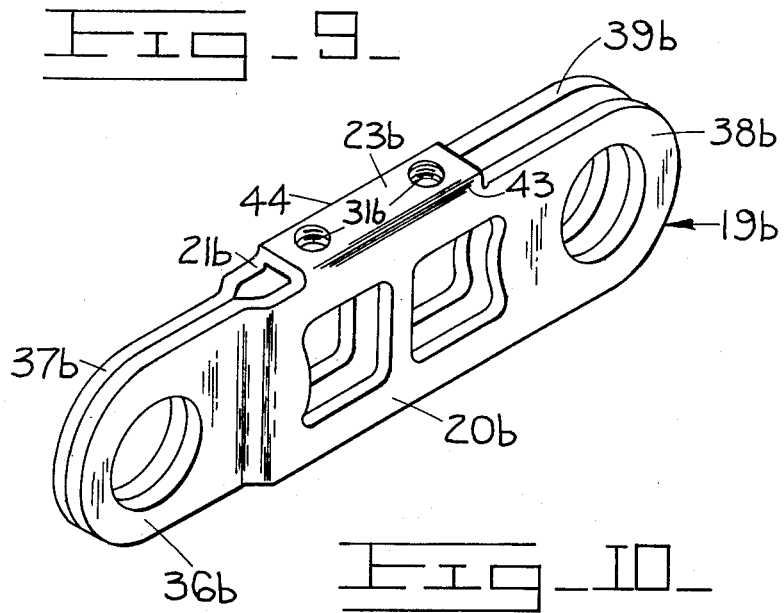
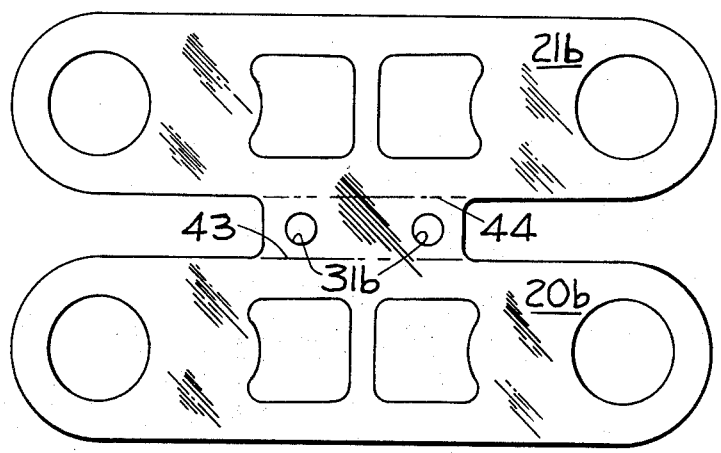
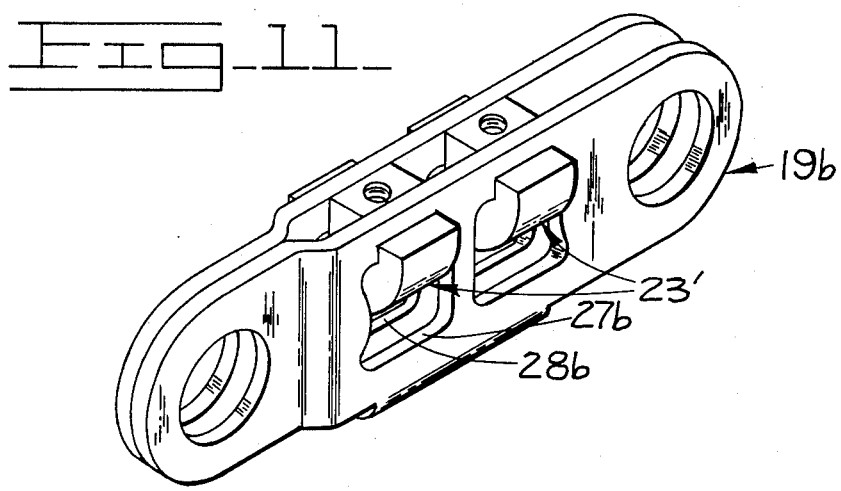

TRACK LINKS FOR CUSHION TRACK

BACKGROUND OF THE INVENTION

A cushion track, such as those disclosed in U.S. Pat. No. 3,601,212 assigned to the assignee of this application, comprises a driver having an annular track assembly mounted thereon. The track assembly comprises a plurality of interconnected links which are normally forged to thus render them expensive to manufacture and weighty in construction. In addition, a link failing its quality control inspection must normally be discarded when an irreparable defect adversely affects the link's structural integrity.

SUMMARY OF THE INVENTION

An object of this invention is to provide an economical and non-complex link for an articulated link assembly which exhibits a high degree of structural integrity and ability to be assembled expeditiously. Each link, particularly adapted for use in the track assembly of a cushion track, comprises first and second parallel link members connected to each of the shoes and pivot means connecting each pair of circumferentially adjacent links together. Retaining means are connected to the first and second link members to extend transversely therefrom and attaching means, such as bolts, releasably attach the retaining means directly to a respective one of the shoes.

BRIEF DESCRIPTION OF THE DRAWINGS

Further objects of this invention will become apparent from the following description and accompanying drawings wherein:

FIG. 1 is an isometric view partially illustrating a cushion track comprising a track assembly mounted on an annular driver;

FIG. 2 is a sectional view of the cushion track, taken in the direction of arrows II—II in FIG. 1, particularly illustrating first retaining means and link embodiments of the track assembly;

FIG. 3 is a front elevational view of the retaining means, per se;

FIG. 4 is a view similar to FIG. 3, but illustrating a modification of the retaining means;

FIG. 5 is an isometric view illustrating second retaining means and link embodiments;

FIG. 6 is an end elevational view of the second link embodiment, taken in the direction of arrows VI—VI in FIG. 5;

FIG. 7 is a sectional view, taken in the direction of arrows VII—VII in FIG. 5, particularly illustrating a bearing arrangement employed to pivotally connect adjacent links together;

FIG. 8 is a view similar to FIG. 7, but illustrating a modification of the bearing arrangements;

FIG. 9 is an isometric view illustrating third retaining means and link embodiments;

FIG. 10 is a top plan view of a sheet metal blank employed to form the FIG. 9 link; and FIG. 11 is an isometric view illustrating an embodiment wherein the FIG. 4 retaining means is combined with the FIG. 9 link.

DETAILED DESCRIPTION

FIGS. 1 and 2 partially illustrate a cushion track 15 of the type disclosed in above-mentioned U.S. Pat. No. 3,601,212. In particular, the cushion track comprises an annular resilient spacer means or driver 16 having a substantially annular polygonal-shaped endless track assembly 17 mounted completely therearound. The driver may comprise an air-inflated rubber tire or air bag, for example, mounted on rim assembly (not shown).

The endless track assembly comprises a plurality of closely coupled ground engaging track shoes 18, circumferentially surrounding the driver. An annular articulated link assembly or connecting means is preferably positioned on each side of the driver to unitize the driver and track assembly. Each articulated link assembly is releasably connected to the shoes and comprises links 19, each consisting of first and second parallel link members 20 and 21, pivotally connected to circumferentially adjacent links by pivot means or pin 22 for pivotal movement about a common pivot axis thereof.

As more clearly illustrated in FIG. 2, a first retaining means embodiment 23 comprises a generally T-shaped retaining member having a mid-portion 24 disposed between and extending transversely from the first and second link members and a pair of outboard portions 25 and 26, extending transversely from the mid-portion. The outboard portions are disposed in slots 27 and 28, formed through link members 20 and 21, respectively. Attaching means, shown in the form of a bolt 29, extends through a threaded hole 31 formed in mid-portion 24 to connect the member and link members to track shoe 18. Bearing surfaces 32 and 33 are formed on outboard portions 25 and 26, respectively, to abut underlying surface portions of the link members, defining the top portions of slots 27 and 28.

FIG. 4 illustrates a modified retaining member 23' wherein hook portions 34 and 35, disposed generally parallel to a mid-portion 24', are integrally formed on the extremities of outboard portions 25' and 26', respectively. The hook portions (FIGS. 1 and 2) each abut an outer sidewall of a respective one of the link members to prevent lateral separation thereof.

Although the FIGS. 3 and 4 retaining members are shown in FIG. 1 as being employed for each pair of link members, it should be understood that a pair of identical members 23 or members 23' may be employed in lieu thereof. Link members 20 and 21 of the first link embodiment illustrated in FIGS. 1 and 2 are separable and comprise first ends 36 and 37, respectively, maintained in abutting contact. Second, laterally spaced ends 38 and 39 of the link members are pivotally attached by pivot pin 22 to first ends 36 and 37 of a circumferentially adjacent link.

FIGS. 5–11 illustrate second retaining means and link embodiments wherein structures similar to those illustrated in FIGS. 1–3 are depicted by identical numerals. Such numerals are accompanied by an "a" in FIGS. 5–8 and by a "b" in FIGS. 9–11.

FIGS. 5–8 illustrate second link embodiments 19a, each comprising a pair of first and second link members 20a and 21a which are substantially straight and parallel throughout their entire lengths. Each circumferentially adjacent pair of links are connected together by a pivot pin 22a. A second retaining means embodiment 23a comprises a flange integrally formed on each of the link members to extend transversely therefrom. The free edges of the flanges abut each other to maintain the link members in laterally spaced relationship. The identically formed link members thus position threaded apertures 31a, each adapted to receive an attachment bolt therethrough, in aligned relationship with apertures formed through a respective track shoe (not shown) for attachment thereto.

FIG. 7 illustrates pivot pin 22a press-fitted or otherwise suitably secured to the laterally spaced link members. The intermediate and abutting link members of the circumferentially adjacent link have a cylindrical bearing bushing 40 secured therein and rotatably mounted on the pivot pin. Alternatively, as shown in FIG. 8, pivot pin 22a may be press-fitted into intermediate link members 20a' and 21a' and a pair of cylindrical bearing bushings 41 and 42 may be press-fitted into bores suitably formed in the adjacent, laterally spaced link members.

FIGS. 9 and 10 illustrate a third link embodiment 19b which may be initially formed as a sheet metal stamping (FIG. 10), folded at parallel fold lines 43 and 44 to define first and second link members 20b and 21b. The third retaining means embodiment comprises a flange 23b extending transversely from and integrally connected between the link members at such fold lines. Apertures 31b are formed through the flange to adapt the link for attachment to a track shoe by bolt means (not shown). First ends 36b and 37b of the link members are disposed in abutting relationship whereas parallel second ends 38b and 39b thereof are spaced apart laterally to adapt such ends for attachment to the first ends of the next adjacent link members.

FIG. 11 illustrates a further embodiment of the link which essentially combines retaining means 23' (FIG. 4) with the FIG. 9 link. In particular, the FIG. 9 link is inverted (and need not have apertures 31b formed therethrough) and retaining means 23' are disposed in slots 27b and 28b, formed through the link members.

What is claimed is:
1. A track assembly comprising
a plurality of closely coupled ground-engaging track shoes and
at least one articulated link assembly releasably connected to said shoes to closely couple said shoes together, said link assembly comprising
a plurality of articulated links each consisting of first and second parallel link members connected to each one of said shoes,
pivot means connecting each pair of circumferentially adjacent links together for pivotal movement about a common pivot axis thereof, and
retaining means connected to and extending transversely from said first and second link members, and
attaching means releasably attaching said retaining means directly to a respective one of said shoes for releasably connecting said link assembly to said shoes.

2. The invention of claim 1 further comprising an annular resilient driver, said track assembly mounted completely around said driver for unitizing said driver therewith.

3. The invention of claim 2 wherein one of said link assemblies is positioned adjacent to each sidewall of said driver and extends radially inwardly from said shoes.

4. The invention of claim 1 wherein said retaining means comprises a generally T-shaped member having a mid-portion disposed between said first and second link members and a pair of outboard portions extending transversely from said mid-portion, each of said outboard portions disposed in a slot formed in a respective one of said link members, said attaching means extending through said mid-portion.

5. The invention of claim 4 wherein a bearing surface formed on each of said outboard portions abuts underlying surface portions of said link members, defined by each of said slots.

6. The invention of claim 5 further comprising a hook portion, disposed generally parallel to said mid-portion, integrally formed on an extremity of each of said outboard portions and abutting an outer sidewall of each of said first and second link members.

7. The invention of claim 4 wherein a pair of said generally T-shaped members are disposed between said first and second link members.

8. The invention of claim 7 wherein said attaching means comprises at least one releasable bolt means.

9. The invention of claim 4 wherein said first and second link members are separable and comprise first ends maintained in abutting relationship and second opposite ends laterally spaced from each other and attached by said pivot means to the first ends of circumferentially adjacent first and second link members.

10. The invention of claim 4 further comprising a flange disposed between the integrally connected to each of said first and second link members by a foldline, said flange spaced radially outwardly from said T-shaped member.

11. The invention of claim 1 wherein said retaining means comprises a flange integrally formed on each of said first and second link members to extend laterally therefrom.

12. The invention of claim 11 wherein said first and second link members are substantially straight and parallel throughout their entire lengths.

13. The invention of claim 12 wherein free edges of the flanges of first and second link members of one link of said pair of circumferentially adjacent links extend towards each other into abutting relationship to maintain such link members in laterally spaced relationship and wherein first and second link members of a second link of said pair of circumferentially adjacent links are maintained in abutting relationship so that the flanges secured thereto extend laterally away from each other.

14. The invention of claim 1 wherein said retaining means comprises a flange disposed between and integrally connected to each of said first and second link members at a foldline, said link comprising a foldable sheet metal material.

15. The invention of claim 14 wherein first ends of said first and second link members are disposed in abutting relationship and second ends thereof are spaced apart laterally to adapt such ends for attachment to the first ends of the next adjacent link members.

16. The invention of claim 1 wherein said pivot means comprises a pivot pin secured to outer first and second laterally spaced link members of a first link of said pair of circumferentially adjacent links and a bearing bushing secured to inner first and second link members of a second link of said pair of circumferentially adjacent links and rotatably mounted on said pivot pin.

17. The invention of claim 1 wherein said pivot means comprises a pivot pin secured to inner first and second abutting link members of a first link of said pair of circumferentially adjacent links and a bearing bushing secured to each outer first and second laterally spaced link members of a second link of said pair of circumferentially adjacent links and rotatably mounted on said pivot pin.

18. A link adapted for use in an articulated link assembly comprising first and second parallel link members, retaining means connected to and extending transversely from said first and second link members, said retaining means comprising a generally T-shaped member having a mid-portion disposed between said first and second link members and a pair of outboard portions extending laterally from said mid-portion, each of said outboard portions disposed in a slot formed in a respective one of said link members, and means forming at least one aperture through the mid-portion of said retaining means adapted to receive attaching means therethrough for releasably attaching said retaining means directly to a shoe of a track assembly.

19. The invention of claim 18 further comprising a flange disposed between and integrally connected to each of said first and second link members by a foldline, said flange spaced radially inwardly from said T-shaped member.

20. The invention of claim 18 wherein a bearing surface formed on each of said outboard portions abuts underlying surface portions of said link members, defined by each of said slots.

21. The invention of claim 20 further comprising a hook portion, disposed generally parallel to said mid-portion on the extremity of each of said outboard portions, abutting an outer sidewall of each of said first and second link members.

22. The invention of claim 18 wherein a pair of said generally T-shaped members are disposed between said first and second link members.

23. The invention of claim 18 wherein said first and second link members are separable and comprise first ends maintained in abutting relationship and second opposite ends laterally spaced from each other adapted to be attached to the first ends of circumferentially adjacent first and second link members.

* * * * *